United States Patent
Liu et al.

(10) Patent No.: US 10,901,802 B2
(45) Date of Patent: Jan. 26, 2021

(54) METHOD AND APPARATUS FOR IMPLEMENTING VIRTUAL GPU AND SYSTEM

(71) Applicant: ALIBABA GROUP HOLDING LIMITED, George Town (KY)

(72) Inventors: Lingfei Liu, Hangzhou (CN); Shuangtai Tian, Hangzhou (CN); Xin Long, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 161 days.

(21) Appl. No.: 15/996,306

(22) Filed: Jun. 1, 2018

(65) Prior Publication Data
US 2018/0349204 A1    Dec. 6, 2018

(30) Foreign Application Priority Data
Jun. 2, 2017    (CN) .......................... 2017 1 0407827

(51) Int. Cl.
*G06F 9/50*    (2006.01)
*G06F 9/455*    (2018.01)
*G06F 9/48*    (2006.01)

(52) U.S. Cl.
CPC ........ *G06F 9/5077* (2013.01); *G06F 9/45558* (2013.01); *G06F 9/4881* (2013.01); *G06F 9/5038* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 2015/0378753 A1* | 12/2015 | Phillips | G06F 9/505 718/1 |
| 2016/0239333 A1 | 8/2016 | Cowperthwaite et al. | |
| 2017/0132747 A1 | 5/2017 | Wilt et al. | |
| 2018/0218473 A1* | 8/2018 | Hoppert | G06T 1/20 |

FOREIGN PATENT DOCUMENTS

WO    WO 2018/223075 A1    12/2018

OTHER PUBLICATIONS

Cale Rogers, "GPU Virtualization with KVM / QEMU", Sep. 17, 2019, https://medium.com/@calerogers/gpu-virtualization-with-kvm-qemu-63ca98a6a172 (Year: 2016).*
PCT International Search Report and Written Opinion dated Oct. 17, 2018, issued in corresponding International Application No. PCT/US2018/035715 (13 pgs.).

* cited by examiner

*Primary Examiner* — Wynuel S Aquino
(74) *Attorney, Agent, or Firm* — Finnegan, Henderson, Farabow, Garrett & Dunner, LLP

(57) ABSTRACT

Embodiments of the present application provide a method for implementing a virtual GPU. The method for implementing a virtual GPU includes: allocating to each of the virtual GPUs a running time slice corresponding to the resource requirement of the virtual GPU according to resource requirements of virtual GPUs running on the same physical GPU, wherein a sum of running time slices of all virtual GPUs configured on a physical GPU is less than or equal to a scheduling period; and allocating resources of the physical GPU to the virtual GPUs according to the running time slices allocated to the virtual GPUs.

18 Claims, 6 Drawing Sheets

METHOD AND APPARATUS FOR IMPLEMENTING VIRTUAL GPU AND SYSTEM

CROSS REFERENCE TO RELATED APPLICATION

The disclosure claims the benefits of priority to Chinese application number 201710407827.8, filed Jun. 2, 2017, which is incorporated herein by reference in its entirety.

BACKGROUND

A Graphics Processing Unit (GPU) segmentation and virtualization technology can virtualize and segment resources of one physical GPU for use by one or more virtual machines, and can be referred to as a one-to-multiple GPU virtualization technology. Each segment of the GPU is referred to as one virtual GPU.

Conventionally, during virtualization of a physical GPU, multiple virtual GPUs obtained by dividing the physical GPU can have a same specification. For example, one physical GPU can support virtual GPUs of four types (e.g., A, B, C, and D). The performance of type A equals the performance of the physical GPU, the performance of type B equals ½ of the performance of the physical GPU, the performance of type C equals ¼ of the performance of the physical GPU, and the performance of type D equals ⅛ of the performance of the physical GPU. Then the physical GPU can only be one virtual GPU of type A, or divided into two virtual GPUs of type B (each occupying 50% of the resources of the physical GPU), or divided into four virtual GPUs of type C (each occupying 25% of the resources of the physical GPU), or divided into eight virtual GPUs of type D. Unless a physical server is reconfigured, the division cannot be dynamically changed once being made. That is, only one type of virtual GPU can run on one physical GPU. Virtual GPUs used in a GPU instance on a same physical server all have the same specification.

Conventionally, a control system can record in advance a division manner of a physical GPU and a quantity of virtual GPUs on each physical server. A request for creating a virtual machine can be issued according to a storage status of a database. At a physical machine side, the division of a physical GPU into virtual GPUs can be completed as soon as the physical machine is started and cannot be changed as needed when the physical machine is being used. The data at the control system side and the division of resources on the physical machine can be statically configured as soon as a cluster is deployed and be kept consistent during the entire service. Only virtual GPUs of a homogenous segmentation type can run on one identical physical GPU. Virtual GPUs of heterogeneous segmentation types cannot run on one identical physical GPU. The performance of a virtual GPU cannot be dynamically adjusted.

SUMMARY OF THE DISCLOSURE

Embodiments of the present application provides an architecture system for managing a virtual GPU. The architecture system can include a control system configured to determine whether a physical GPU has sufficient resources for creating the virtual GPU; a resource manager configured to allocate resources of the physical GPU and create the virtual GPU; a virtualization-supporting toolkit configured to add the virtual GPU to a specification file of a virtual machine; and a scheduling policy unit configured to schedule, add, delete or upgrade the virtual GPU.

Embodiments of the present application further provides a method for implementing a virtual GPU. The method can include: allocating each of virtual GPUs a running time slice corresponding to a resource requirement of the virtual GPU according to resource requirements of the virtual GPUs running on a physical GPU, wherein a sum of running time slices of virtual GPUs configured on the physical GPU is less than or equal to a scheduling period; and allocating resources of the physical GPU to the virtual GPUs according to the running time slices allocated to the virtual GPUs.

Embodiments of the present application further provide an apparatus for implementing a virtual GPU. The apparatus can include: an allocating unit configured to allocate each of virtual GPUs a running time slice corresponding to a resource requirement of the virtual GPU, according to resource requirements of the virtual GPUs running on a physical GPU, wherein a sum of running time slices of all virtual GPUs configured on the physical GPU is less than or equal to a scheduling period; and a scheduling unit configured to allocate resources of the physical GPU to the virtual GPUs according to the running time slices allocated to the virtual GPUs.

Embodiments of the present application further provide a non-transitory computer readable medium that stores a set of instructions that is executable by at least one processor of an electronic device to cause the device to perform a method for implementing a virtual GPU. The method can include: allocating each of virtual GPUs a running time slice corresponding to a resource requirement of the virtual GPU according to resource requirements of the virtual GPUs running on a physical GPU, wherein a sum of running time slices of virtual GPUs configured on the physical GPU is less than or equal to a scheduling period; and allocating resources of the physical GPU to the virtual GPUs according to the running time slices allocated to the virtual GPUs.

DETAILED DESCRIPTION

In the following detailed description, reference is made to the accompanying drawings that form a part of the specification, where like numerals designate like parts throughout, and embodiments illustrated therein can be implemented by the subject matter of the present invention. It is to be understood that other embodiments may be utilized, and structural or logical changes may be made without departing from the scope of the present invention. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of the specification should not be construed as implying that these operations are necessarily order-dependent. In particular, these operations may be performed not in the order of presentation. Operations described herein may be performed in an order different from that in the described embodiment. Various additional operations may be performed and/or described operations may be omitted in additional embodiments.

For the purposes of the present invention, the phrase "A and/or B" means (A), (B), or (A and B). For the purposes of the present invention, the phrase "A, B, and/or C" means (A), (B), (C), (A and B), (A and C), (B and C), or (A, B, and C).

Phrases "in an embodiment" or "in embodiments" are used in the specification, which may each refer to one or more of the same or different embodiments. Furthermore, the terms "comprising", "including", "having" and the like, as used as reference in the embodiments of the present invention, are synonymous.

As used here, the terms "circuit," "logic," "unit," "module," or any portion thereof (e.g., subunit or submodule) may indicate, partially be or include an Application-Specific Integrated Circuit (ASIC), an electronic circuit, a processor (a shared processor, a dedicated processor or a processor group) and/or a memory (a shared memory, a dedicated memory or a memory group) configured to perform one or more software or firmware programs, a combinational logic circuit, and/or other suitable components that provide the described functions.

Figure 1:
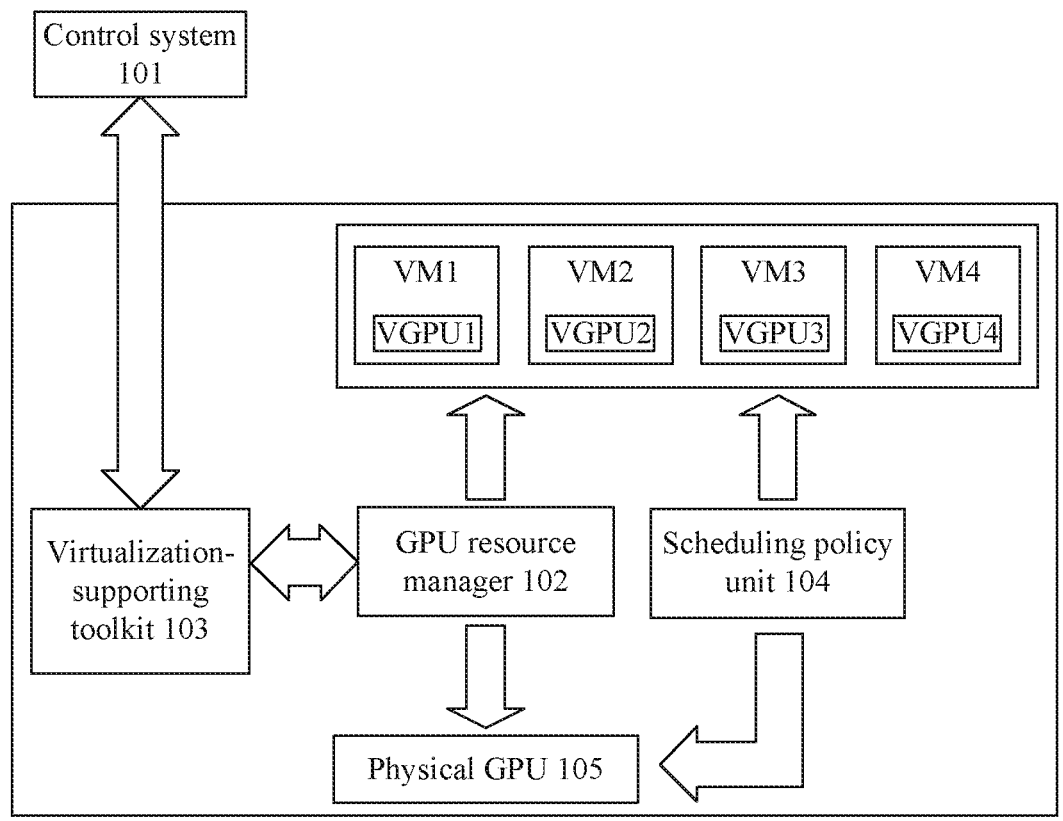
FIG. 1 illustrates a schematic diagram of an architecture system according to embodiments of the present application.

Embodiments of the present application provide an architecture system, FIG. 1 illustrates a schematic diagram of the architecture system according to embodiments of the present application. In FIG. 1, the system includes a control system 101, a GPU resource manager 102, a virtualization-supporting toolkit 103, a scheduling policy unit 104, a physical GPU 105, a virtual machine (e.g., VM1, VM2, VM3, and VM4), and a virtual GPU (e.g., VGPU1, VGPU2, VGPU3, and VGPU4).

Control system 101 can be configured to query whether a physical machine has sufficient resources for creating a type of virtual GPU. In some embodiments, control system 101 runs on a cluster.

GPU resource manager 102 can be configured to manage and allocate resources of a physical GPU.

Virtualization-supporting toolkit 103 can be configured to serve as an interaction channel between the control system and the GPU resource manager and to add the virtual GPU to a specification file of the virtual machine. In some embodiments, virtualization-supporting toolkit may be the libvirt virtualization API.

Scheduling policy unit 104 can be configured to dynamically schedule, add, delete or upgrade the virtual GPU.

The virtual machine (e.g., VW1, VM2, VM3, and/or VM4) provides computing resources for users. An operating system and applications run on the virtual machine. Each virtual GPU is used as a part of a virtual machine to provide users with computing resources for implementing GPU computation on the virtual machine. Therefore, on a level of the virtual machine, the virtual GPU is a part of the virtual machine. In another aspect, from the perspective of physical implementations, the virtual GPU can be implemented based on a physical GPU. Multiple virtual GPUs may be disposed on one physical GPU.

Virtual GPUs can be implemented on physical GPU 105 by allocating and using resources of physical GPU 105 in dimensions of time, space, and the like. Resources of the physical GPU include a running time slice and a frame buffer space. To dispose a virtual GPU on a physical GPU, a running time slice of the physical GPU can be allocated to the virtual GPU, and at the same time, a corresponding frame buffer space can be allocated to the virtual GPU. Multiple virtual GPUs may be disposed on the same physical GPU in the foregoing manner. Each virtual GPU can be provided to one virtual machine for use.

In the architecture system according to embodiments of the present application, scheduling policy unit 104 can be used for dynamically scheduling, creating, deleting or upgrading a virtual GPU on a physical GPU. And the scheduling policy unit may be implemented as a program module or a hardware module configured to implement the foregoing operations related to the virtual GPU. The dynamic scheduling of the physical GPU on the physical GPU is substantially the implementation of the virtual GPU when the virtual GPU has already been created. Therefore, the scheduling of a virtual GPU may be considered as the implementation of the virtual GPU. Based on this, the functions of creating, deleting, and upgrading a virtual GPU can be used for implementing a virtual GPU. That is, a method for implementing a virtual GPU can include the functions of scheduling, creating, deleting, and upgrading a virtual GPU, and other related functions. Embodiments are provided below describing methods for implementing a virtual GPU.

The foregoing dynamic scheduling, creation, deletion, and upgrade of a virtual GPU and other functions related to implementation of a virtual GPU may depend on the architecture system provided in FIG. 1. The foregoing various functions for managing a virtual GPU operate on the architecture system. Certainly, different particular implementation manners can be used for each part. For example, the virtualization-supporting toolkit may be libvirt, or may also be a virtualization toolkit in another form.

Embodiments of the present application provide a method for implementing a virtual GPU. The implementation method may operate on the architecture system in FIG. 1 or may operate on another architecture system.

Figure 2:
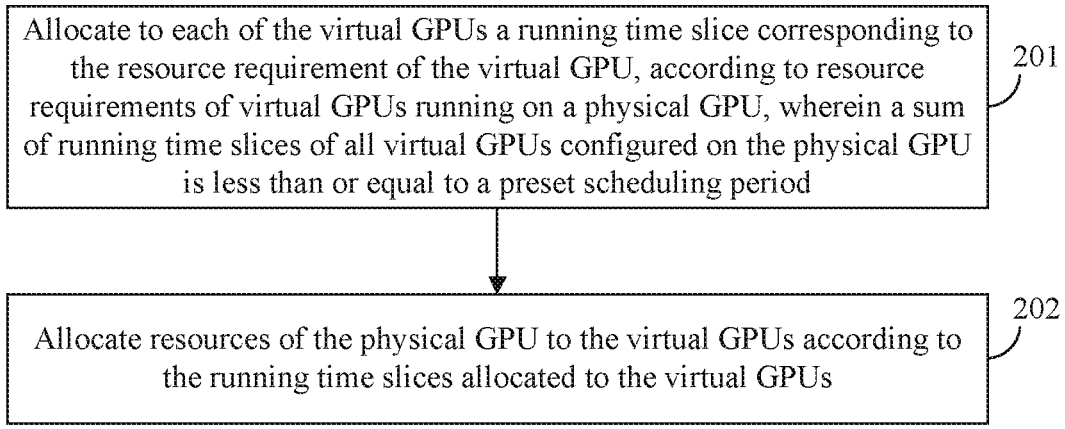
FIG. 2 is a flowchart of a method for implementing a virtual GPU according to embodiments of the present application.

FIG. 2 is a flowchart of a method for implementing a virtual GPU according to embodiments of the present application. The method can include steps 201 and 202.

In step 201, according to resource requirements of virtual GPUs (e.g., VGPU1, VGPU2, VGPU3, and/or VGPU4 of FIG. 1) running on the same physical GPU (e.g., physical GPU 105 of FIG. 1), each of the virtual GPUs can be allocated with a running time slice corresponding to the resource requirement of the virtual GPU. A sum of running time slices of all virtual GPUs disposed on the physical GPU can be less than or equal to a scheduling period upper limit.

The physical GPU is a hardware GPU, and is a chip configured to process graphics in a graphics card.

The virtual GPU can be referred to a GPU running on a GPU virtual machine. The virtual GPU occupies resources of a physical GPU, including a frame buffer space and a running time slice. A user can use a virtual GPU as if he/she were using a physical GPU, and the user cannot perceive the difference between the physical GPU and the virtual GPU.

A resource requirement of the virtual GPU is a requirement of the virtual GPU for occupying resources of a physical GPU, including resource requirements of the virtual GPU for a running time slice and a frame buffer space of the physical GPU. Therefore, the resource requirement can include a time resource requirement and a space resource requirement. Each virtual GPU can be allocated with a running time slice having a fixed length and a frame buffer space of a fixed size when being established.

If resources of a physical GPU that are occupied by virtual GPUs are not limited, and virtual GPUs having different resource requirements are disposed casually as needed, the resources of the physical GPU may consequently not be fully utilized. For example, configured virtual GPUs have occupied 91% of the resources of the physical GPU, and the remaining 9% of the resources of the physical GPU can hardly meet a resource requirement of any virtual GPU required on the virtual machine. As a result, this part of resources can be wasted. Therefore, several specifications can be set to flexibly configure the virtual GPUs. Therefore, the problem that only virtual GPUs having a same specification can be configured can be solved. Moreover, virtual GPUs may not be configured excessively casually, and therefore the waste of resources of a physical GPU can be avoided.

During the establishment of virtual GPUs, different specifications of virtual GPUs may be determined based on the different proportions of resources of a physical GPU that the virtual GPUs can occupy. For example, four specifications A, B, C, and D can be respectively set according to the proportions 100%, 50%, 25%, and 12.5% of the resources of the physical GPU to be occupied.

The proportions of the resources of the physical GPU to be occupied may be determined by using a ratio of a required running time slice to a maximum scheduling period of a physical GPU. The so-called maximum scheduling period is a maximum allowable polling time of all virtual GPUs configured on the physical GPU. When multiple virtual GPUs are configured on one physical GPU, a sum of time for polling all the virtual GPUs can be referred to as a total scheduling period. The total scheduling period cannot exceed the maximum scheduling period. The maximum scheduling period can be stipulated to avoid the situation that virtual GPUs cannot obtain actual computing resources of the physical GPU in a relatively long time, affecting the user experience of a virtual machine where the virtual GPUs are located. The maximum scheduling period can be used as a reference for allocating the computing capability of a physical GPU. Therefore, different types of virtual GPUs can be determined according to the percentages of the maximum scheduling period occupied by the virtual GPUs. For example, when the maximum scheduling period is 40 milliseconds (ms), four running time slices of 40 ms, 20 ms, 10 ms, and 5 ms can be respectively used for the virtual GPUs of the four specifications A, B, C, and D. A corresponding proportion of the frame buffer space can be allocated while a time slice is allocated. For example, when a physical GPU has a frame buffer space of 4 gigabytes (G), 4 G, 2 G, 1 G, and 0.5 G frame buffer spaces can be respectively allocated to the virtual GPUs of the four specifications A, B, C, and D.

The specification of each virtual GPU can be determined upon creation. Virtual GPUs of different specifications can be configured on the same physical GPU. That is, heterogeneous virtual GPUs can be configured.

In step 202, computing resources of the physical GPU can be allocated to the virtual GPUs in a manner of time slice polling according to the running time slices allocated to the virtual GPUs.

Figure 3:
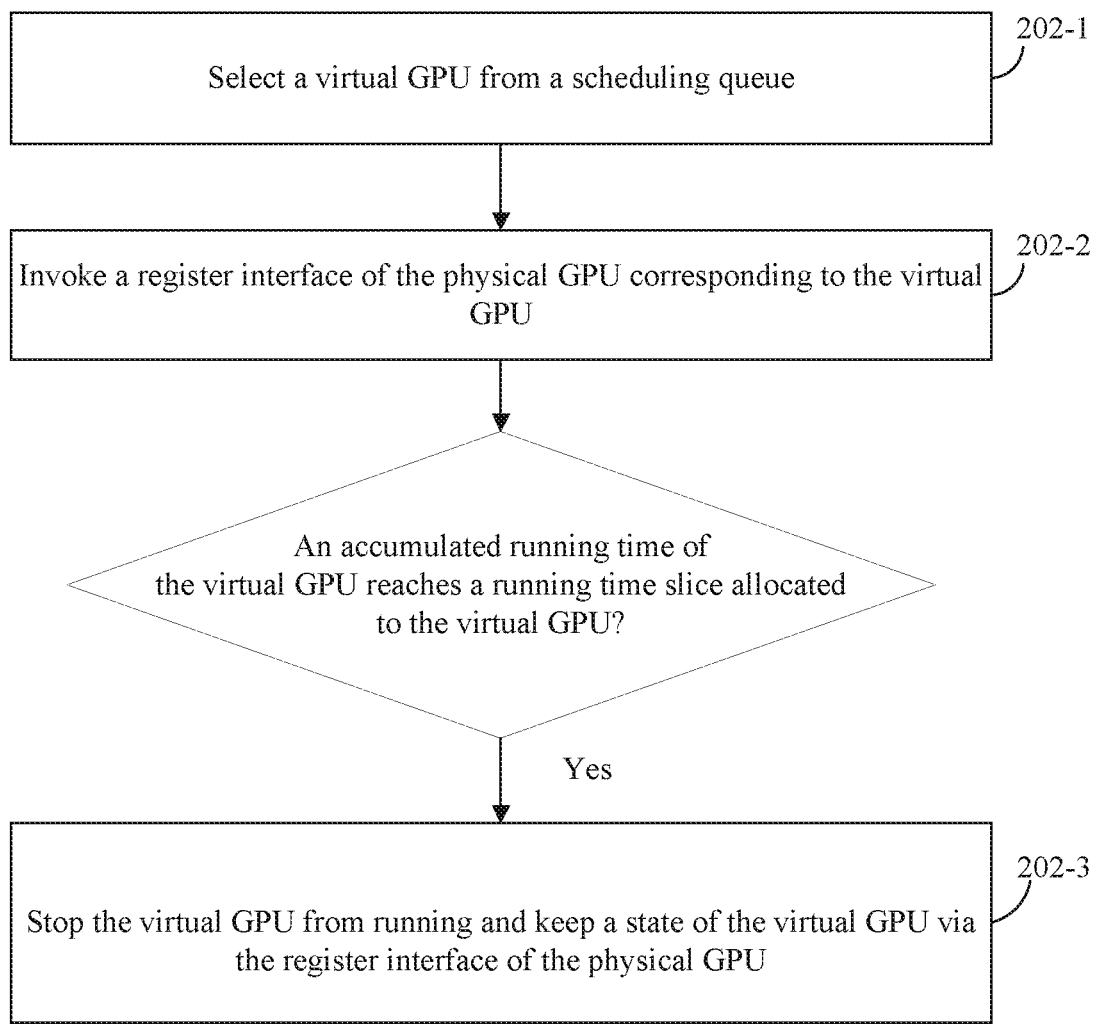
FIG. 3 is a flowchart of a scheduling manner of time slice polling according to embodiments of the present application.

When computing resources of the physical GPU are allocated to the virtual GPUs in a manner of time slice polling, multiple virtual GPUs configured on the same physical GPU can be scheduled according to a queue and use the computing resources provided by the physical GPU in turns. An exemplary implementation manner is provided below. A scheduling manner of time slice polling is introduced below with reference to FIG. 3. The scheduling manner of time slice polling can include steps 202-1, 202-2, and 202-3.

In step 202-1, a next ready-to-run virtual GPU can be selected from a scheduling queue.

The virtual GPU can correspond to a process during actual running. Therefore, processes of virtual GPUs disposed on the same physical GPU wait to be scheduled in the same queue. Each process includes an identity (ID) of a virtual GPU corresponding to the process. A control system (e.g., control system 101 of FIG. 1) can use a polling approach to determine a next ready-to-run virtual GPU and load the process of the virtual GPU, so as to select the virtual GPU.

In step 202-2, a register interface of the physical GPU corresponding to the virtual GPU can be invoked to run the virtual GPU.

When a process of a virtual GPU is invoked, the process can control a physical GPU. To control a physical GPU from a physical perspective, the process of the virtual GPU can invoke a register interface of a physical GPU where the process is located, and the currently invoked virtual GPU can use the register interface. As such, the virtual GPU can take over and use the physical GPU, and therefore the virtual GPU can run. When the virtual GPU runs, various resources (storage resources, a shared memory, a register, and the like) on the physical GPU can be used to serve the virtual GPU, to keep a program that runs on the virtual GPU in a state of being processed.

In step 202-3, the virtual GPU can be stopped from running and the state of the virtual GPU can be kept through the register interface of the physical GPU when an accumulated running time of the virtual GPU reaches a running time slice allocated to the virtual GPU, and the process then returns to the step of selecting a next ready-to-run virtual GPU from a scheduling queue.

An accumulated running time of the virtual GPU can reach a running time slice allocated to the virtual GPU. For example, the virtual GPU can occupy resources of the physical GPU for the time stipulated by the running time slice of the virtual GPU. In this case, the virtual GPU can stop actual occupation of the physical GPU. Before exit, the virtual GPU can stop using the physical GPU through the register interface and save a computing result of the running time slice to a memory. For example, the frame buffer content can be saved to the frame buffer space allocated to the virtual GPU. The virtual GPU can further save the content of some registers to a memory allocated to the virtual GPU. For example, the content of the registers can be saved to a corresponding address mapping register area. At the same time, the process of the virtual GPU can be suspended. From the perspective of a virtual machine, the virtual GPU stops running and the state of the virtual GPU in the foregoing process is kept. As such, the virtual GPU can restart to run from the previous running time slice of the virtual GPU next time when the virtual GPU is invoked.

After one scheduling period is completed, the process enters the next scheduling period. For example, a scheduling queue has two virtual GPUs of the type C and one virtual GPU of the type D. The time slice of the virtual GPU of the type C is 10 ms, and the time slice of the virtual GPU of the type D is 5 ms. One scheduling period is 10+10+5=25 ms. When scheduling lasts for 25 ms, each virtual GPU has a running time corresponding to the time slice of the virtual GPU, and the process enters a next scheduling period after the running time elapses. One scheduling period of one physical GPU may be less than the maximum scheduling period according to the quantity of virtual GPUs running on the physical GPU.

Referring back to FIG. 2, steps 201 and 202 are associated with a dynamic scheduling method for implementing a virtual GPU according to embodiments of the disclosure. A virtual GPU can be implemented based on the scheduling method. The dynamic scheduling method can be applied in scheduling policy unit 104 in a form of a software module. The software module may be referred to as a virtual GPU scheduler.

Based on the foregoing scheduling method, technical solutions of dynamically adding a virtual GPU, dynamically deleting a virtual GPU, dynamically upgrading a virtual GPU, and the like are further needed to implement a virtual GPU more completely.

Methods for dynamically adding a virtual GPU, dynamically deleting a virtual GPU, and dynamically upgrading a virtual GPU are separately described below. These methods are based on the foregoing dynamic scheduling of a virtual GPU and are used to improve the solution for implementing a virtual GPU.

Figure 4:
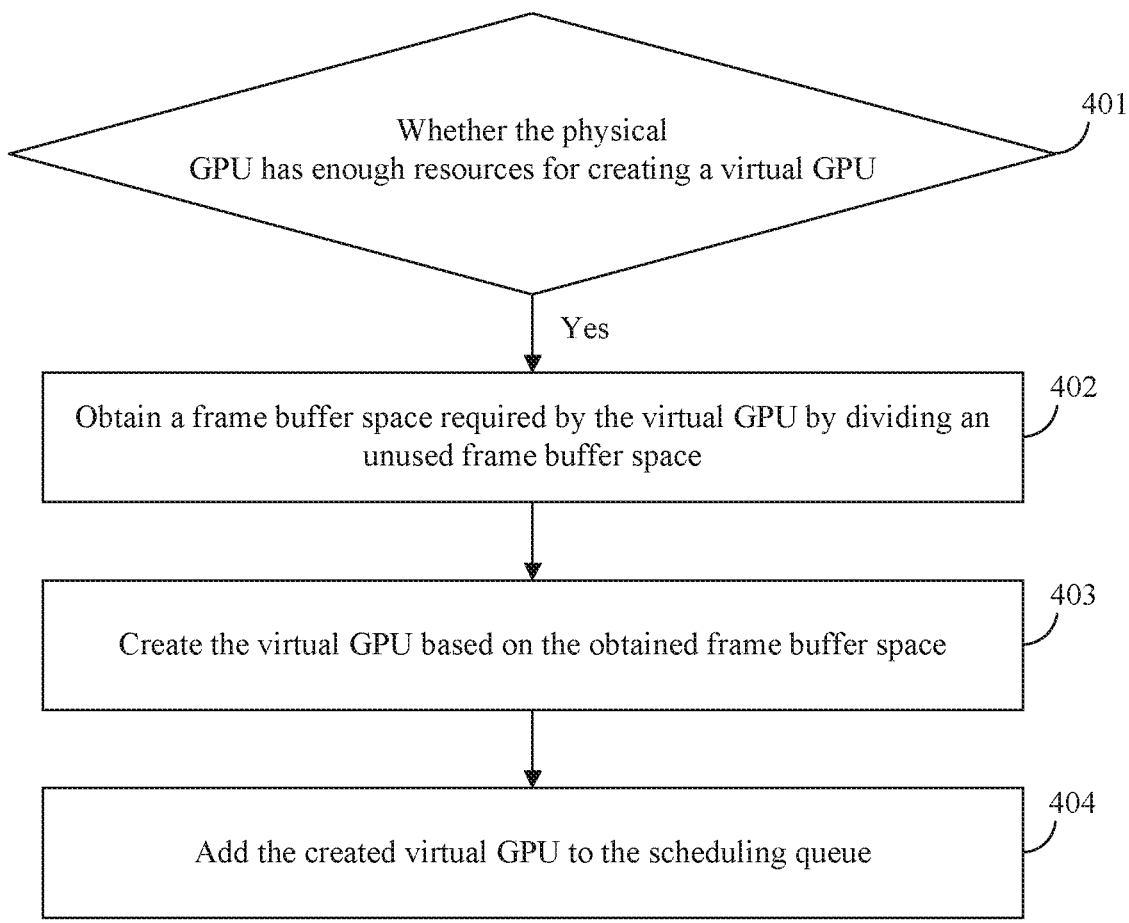
FIG. 4 is a flowchart of adding a virtual GPU to run on a physical GPU according embodiments of the present application.

FIG. 4 is a flowchart of a method of adding a virtual GPU running on a physical GPU, according to embodiments of the present application. The method can include steps 401-404.

In step 401, it is determined whether the physical GPU (e.g., physical GPU 105 of FIG. 1) has a sufficient remaining time slice and a sufficient frame buffer space for creating a virtual GPU (e.g., VGPU1, VGPU2, VGPU3, and/or VGPU4 of FIG. 1). If the physical GPU has a sufficient remaining time slice and a sufficient frame buffer space for meeting a computing resource requirement of a virtual GPU to be created, step 202 can be performed.

To determine whether the physical GPU has a sufficient remaining time slice, it may be determined whether a sum of a time slice for the virtual GPU to be created and time slices of existing virtual GPUs is less than or equal to the maximum scheduling period of the physical GPU. If the sum is less than or equal to the maximum scheduling period of the physical GPU, it is determined that the physical GPU has a sufficient remaining time slice.

For example, the maximum scheduling period of the physical GPU is 40 ms, and a sum of time slices of existing virtual GPUs is 30 ms. In this case, if the time slice of the virtual GPU to be created is 10 ms, it is determined that the physical GPU has a sufficient remaining time slice, and the time resource meets a requirement for creating a new virtual GPU. If the time slice of the virtual GPU to be created is 20 ms, then the sum of the time slice of the virtual GPU to be created and the time slices of the existing virtual GPUs is 50 ms, which is greater than the maximum scheduling period of 40 ms. It is, therefore, determined that there is no sufficient remaining time slice and this type of virtual GPU cannot be created on the physical GPU.

In addition to a sufficient remaining time slice, a sufficient remaining frame buffer space may also be required. Both conditions (e.g., the requirements on the remaining time slice and the remaining frame buffer space) may be satisfied before creating a virtual GPU. To determine whether there is a sufficient frame buffer space, it can be determined whether a total capacity of the remaining frame buffer space is greater than or equal to the frame buffer space for creating the virtual GPU. The sufficient frame buffer space may be discontinuous frame buffer spaces, provided that the total capacity of the frame buffer spaces satisfies the condition. In some embodiments, the sufficient frame buffer space can also be a sufficient continuous frame buffer space to facilitate data access.

For example, the architecture system in FIG. 1 can be used to dynamically add a virtual GPU to run on the physical GPU. As discussed above, in some embodiments, a physical GPU can support virtual GPUs of four types, A, B, C, and D. The performance of type A equals the performance of the physical GPU, the performance of type B equals ½ of the performance of the physical GPU, the performance of type C equals ¼ of the performance of the physical GPU, and the performance of type D equals ⅛ of the performance of the physical GPU. As an example, a user intends to create and add one GPU of the type C to a virtual machine.

The control system can query through an interface of the libvirt virtualization API whether the physical GPU has sufficient computing resources for creating the virtual GPU of the type C. Then libvirt can query whether there are sufficient computing resources for creating the virtual GPU of the type C from a GPU resource manager. The GPU resource manager can detect one physical GPU. The maximum scheduling period of the physical GPU is 40 ms, and a sum of time slices of original virtual GPUs established on the physical GPU is 30 ms. If the time slice of the virtual GPU of the type C is 10 ms, a sum of the time slices of the existing virtual GPUs and the time slice of the virtual GPU of the type C is 40 ms. It is, therefore, determined that the physical GPU has a sufficient remaining time slice, and the time resource meets a requirement for creating a new virtual GPU. After the time resource meets the requirement, the GPU resource manager can determine whether the physical GPU has a sufficient remaining frame buffer space. In some embodiments, the frame buffer space can be allocated based on a running time slice occupied by a virtual GPU. In other words, the frame buffer space can be associated with the running time slice. Therefore, a sufficient frame buffer space can be provided if there is a sufficient remaining time slice. However, when resources are allocated to a virtual GPU, a corresponding frame buffer space is not always allocated according to a running time slice provided for the virtual GPU. Instead, the frame buffer space requirements of established virtual GPUs may be first met as much as possible. As such, the remaining frame buffer space may be insufficient although there is a remaining time slice. Further, a frame buffer of a physical GPU may be damaged, and as a result, a sufficient frame buffer space cannot be provided for the new virtual GPU.

After it is determined that the physical GPU has a sufficient remaining time slice and a sufficient frame buffer space for meeting a computing resource requirement of a virtual GPU of the type C to be created, the GPU resource manager can return a query result that the creation is feasible to libvirt, which can send the query result to the control system to control the issuing of a request for creating a virtual machine.

In some embodiments, step 401 may further include a process of selecting a physical GPU. For example, in a cloud system, a plurality of physical GPUs can be available, and a physical GPU can be selected for establishing a virtual GPU.

In step 402, a frame buffer space for creating the virtual GPU can be obtained through division from an unused frame buffer space chain.

When the physical GPU has the sufficient remaining time slice and the sufficient frame buffer space for creating a virtual GPU, a frame buffer space for creating the virtual GPU can be obtained by dividing an unused frame buffer space into segments. One of the segments can be used as the space resource for creating the virtual GPU.

In some embodiments, dividing can be performed according to the size of the frame buffer space for creating the virtual GPU. For example, a segment having a size of the frame buffer space for creating the virtual GPU can be generated by dividing the unused frame buffer space. In some embodiments, the unused frame buffer space can be divided into a plurality of segments, and a segment having a size closest to the size of the frame buffer space for creating the virtual GPU can be selected.

Before the frame buffer space for creating the virtual GPU is obtained by dividing the unused frame buffer space chain, the scheduling time (the sum of the time slices of the virtual GPUs) can be changed to the sum of the time slices of the original virtual GPUs (or the sum of the time slices) and the time slice for creating the virtual GPU. For example, the scheduling time can be changed to 40 ms. And the frame buffer space for creating the virtual GPU of type C can be generated by dividing the frame buffer space.

In step 403, the virtual GPU can be created based on the obtained frame buffer space. In some embodiments, the virtual GPU can have a corresponding virtual GPU After a resource requirement for creating the virtual GPU is met and a space resource is obtained, the new virtual GPU can be created. During the process for creating the new virtual GPU, some initial processing can be performed to notify a related virtual machine that the virtual GPU has been prepared.

In step 404, the created virtual GPU can be added to the scheduling queue.

After the virtual GPU has been created, the created virtual GPU can be added to the scheduling queue. As such, when the scheduling policy unit schedules the process of the virtual GPU, the use of the physical GPU can be controlled through a register interface of a physical GPU to trigger switching of the virtual GPU to the newly created virtual GPU.

The GPU resource manager can add the newly created virtual GPU of the type C to the scheduling queue. The newly created virtual GPU of the type C can run together with other virtual GPUs created on the same physical machine in a scheduling manner provided by the scheduling policy unit.

By using the method for implementing a GPU in the present application, the function of adding a virtual GPU to a physical GPU can be implemented, and added virtual GPUs may be heterogeneous GPUs (i.e., having different resource requirements), so that the utilization of resources of the physical GPU can be improved.

The method for scheduling a virtual GPU can further include deleting the virtual GPU running on the physical GPU. Deleting the virtual GPU can include removing a virtual GPU to be deleted from the scheduling queue; and allocating proportionally a running time slice of the virtual GPU to be deleted to remaining virtual GPUs according to computing resource requirements of the remaining virtual GPUs.

A virtual GPU can be deleted by removing the virtual GPU from the scheduling queue, and the resources of the virtual GPU can be released accordingly. In this case, the running time slice of the virtual GPU being deleted can be proportionally released to remaining virtual GPUs according to computing resource requirements of the remaining virtual GPUs.

For example, two virtual GPUs of type C and one virtual GPU of type D can run on a same physical GPU, a maximum scheduling period is 40 ms, a time slice of a virtual GPU of type C is 10 ms, and a time slice of a virtual GPU of type D is 5 ms. An exemplary scheduling queue can be shown as below:

| C1 | C1 | C2 | C2 | D1 | C1 | C1 | C2 | C2 | D1 |
|----|----|----|----|----|----|----|----|----|----|

In this scheduling queue, each block indicates a time slice of 2.5 ms. Therefore, as it can be seen, a first virtual GPU of type C (virtual GPU C1) occupies four time slices (i.e., 10 ms), a second virtual GPU of type C (virtual GPU C2) occupies another four time slices (i.e., 10 ms), and the virtual GPU of type D (virtual GPU D1) occupies two time slices (i.e., 5 ms). In some embodiments, as a sum of all the time slices for the three virtual GPUs (i.e., 25 ms) is less than the maximum scheduling period (i.e., 40 ms), virtual GPU C1 can occupy 40% of time slices of the physical GPU, virtual GPU C2 can occupy another 40% of the time slices of the physical GPU, and virtual GPU D can occupy 20% of the time slices of the physical GPU during the actual running of the virtual GPUs.

As discussed, virtual GPU C2 can be deleted dynamically. Then the scheduling queue can be changed as below.

| C1 | C1 | D1 | C1 | C1 | D1 | ... |
|----|----|----|----|----|----|-----|

The scheduling period for running virtual GPUs can be reduced and changed to 10+5=15 ms. The 10 ms released by virtual GPU C2 can be proportionally allocated to virtual GPUs C1 and D. The resources that each virtual GPU occupies can be increased.

The method for scheduling a virtual GPU can further include modifying a virtual GPU running on the physical GPU. Modifying the virtual GPU running on the physical GPU can include determining whether a sum of running time slices of virtual GPUs after upgrade is less than or equal to the maximum scheduling period; and if the sum of running time slices of virtual GPUs after upgrade is less than or equal to the maximum scheduling period, modifying a running time slice of the virtual GPU running on the physical GPU to a new running time slice corresponding to a modified scheduling queue.

For example, the virtual GPU of type D (i.e., virtual GPU D1) can be modified to the virtual GPU of type C. Therefore, whether a sum of running time slices of virtual GPUs after upgrade is less than or equal to the maximum scheduling period can be determined first. For example, the sum of running time slices of virtual GPUs after upgrade can be 10+10+10=30 ms, which is less than the maximum scheduling period of 40 ms. Therefore, the upgrade can be performed. After the virtual GPU is upgraded, only the time slice corresponding to virtual GPU D1 can be modified, and the scheduling queue after the upgrade can be as below.

| C1 | C1 | C2 | C2 | C3 | C3 | C1 | C1 | C2 | C2 | C3 | C3 |
|----|----|----|----|----|----|----|----|----|----|----|----|

By means of dynamic upgrade, resources of a physical GPU can be fully utilized, and the computing capability of the GPU can be improved.

By use of the method, multiple heterogeneous virtual GPUs can run on the same physical GPU, and a virtual GPU can further be dynamically added, deleted, or upgraded. One or more new virtual GPUs can be created as long as a physical GPU still has sufficient resources. After some virtual GPUs are deleted, resources occupied by the virtual GPUs may be provided to other virtual GPUs for use. Therefore, the full utilization of GPU resources can be ensured and the performance of the GPU can be improved.

Figure 5:
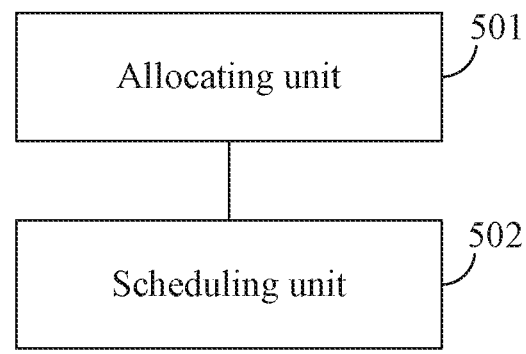
FIG. 5 illustrates a schematic diagram of an apparatus for scheduling a virtual GPU according to embodiments of the present application.

Embodiments of the present application further provide an apparatus for implementing a virtual GPU. The apparatus embodiment is basically similar to the method embodiment. Therefore, the description is relatively simple, and for related parts, refer to the description of the parts in the method embodiment. The apparatus embodiment described below is merely schematic. The embodiment of the apparatus for implementing a virtual GPU is as follows:

FIG. 5 illustrates a schematic diagram of an apparatus 500 for implementing a virtual GPU according to embodiments of the present application. Apparatus 500 can include an allocating unit 501 and a scheduling unit 502.

Allocating unit 501 can be configured to, according to resource requirements of virtual GPUs configured on a physical GPU, allocate to each of the virtual GPUs a running time slice corresponding to the resource requirement of the virtual GPU, wherein a sum of running time slices of all virtual GPUs configured on the physical GPU is less than or equal to a scheduling period.

Scheduling unit 502 can be configured to allocate computing resources of the physical GPU to the virtual GPUs when more than one virtual GPU is configured on the physical GPU. For example, the computing resources can be allocated in a scheduling manner of time slice polling.

The virtual GPUs provided by the apparatus can have different resource requirements.

In some embodiments, scheduling unit 502 can include: a selecting subunit configured to select a next ready-to-run virtual GPU from a scheduling queue; a running subunit configured to invoke a register interface of the physical GPU corresponding to the virtual GPU to run the virtual GPU; and a stop subunit configured to stop the virtual GPU from running and keep the state of the virtual GPU through the register interface of the physical GPU when an accumulated running time of the virtual GPU reaches a running time slice allocated to the virtual GPU, and then return to the step of selecting a next ready-to-run virtual GPU from a scheduling queue.

In some embodiments, apparatus 500 can include an adding subunit configured to dynamically add a virtual GPU to run on the physical GPU. The adding subunit can further include a time slice and buffer area determining subunit, a dividing subunit, a creating subunit, and an adding subunit. The time slice and buffer area determining subunit can be configured to determine whether the physical GPU has a sufficient remaining time slice and a sufficient frame buffer space for meeting a computing resource requirement of a virtual GPU to be created. The dividing subunit can be configured to obtain a frame buffer space for creating the virtual GPU through division from an unused frame buffer space chain when an output of the determining subunit is that the physical GPU has a sufficient remaining time slice and a sufficient frame buffer space. The creating subunit can be configured to create the virtual GPU to be created and acquire a corresponding virtual GPU ID. The adding subunit can be configured to add the virtual GPU to be created to the scheduling queue.

In some embodiments, the time slice determining subunit can be further configured to: determine whether a sum of a time slice that should be allocated to the virtual GPU to be created and time slices of original virtual GPUs is less than or equal to the scheduling period upper limit of the physical GPU. If a sum of a time slice that should be allocated to the virtual GPU to be created and time slices of original virtual GPUs is less than or equal to the scheduling period upper limit of the physical GPU, the time slice determining subunit is further configured to determine that the physical GPU has a sufficient remaining time slice.

In some embodiments, the frame buffer space of the sufficient frame buffer space is a continuous frame buffer space.

In some embodiments, the dividing subunit can be configured to: find a segment whose size is the closest to the size of the frame buffer space for the virtual GPU to be created from the unused frame buffer space chain, to obtain the frame buffer space for the virtual GPU to be created through division.

In some embodiments, the apparatus for scheduling a virtual GPU can include a deleting unit configured to dynamically delete a virtual GPU running on the physical GPU. The deleting unit can include a removal subunit and an allocating subunit. The removal subunit can be configured to remove a virtual GPU to be deleted from the scheduling queue. The allocating subunit can be configured to allocate proportionally a running time slice of the virtual GPU to be deleted to remaining virtual GPUs according to computing resource requirements of the remaining virtual GPUs.

In some embodiments, the apparatus for scheduling a virtual GPU can include an upgrade unit configured to dynamically upgrade a virtual GPU running on the physical GPU, The upgrade unit can include: a determining subunit configured to determine whether a sum of a running time slice of the virtual GPU for upgrading and running time slices of other virtual GPUs is less than or equal to the scheduling period. The upgrade unit can further include: a change subunit configured to modify (e.g., update) the running time slice of the virtual GPU for upgrading to the running time slice corresponding to the upgraded virtual GPU in the scheduling queue when the sum of the running time slice of the virtual GPU for upgrading and running time slices of other virtual GPUs is less than or equal to the scheduling period.

Embodiments of the present application can further provide a system. The system can be a computer system.

Figure 6:
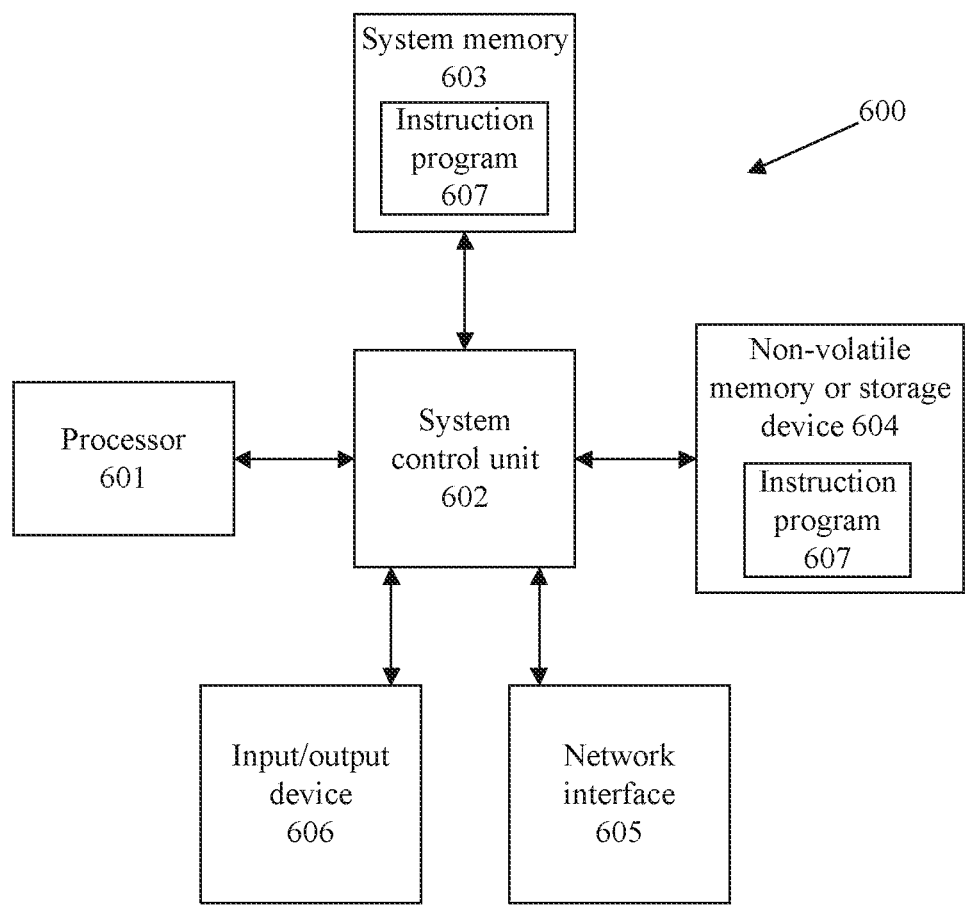
FIG. 6 illustrates a schematic diagram of a system according to embodiments of the present application.

FIG. 6 illustrates a schematic diagram of an embodiment of a system 600 according to embodiments of the present application. System 600 may include: a processor 601, a system control unit 602 coupled to processor 601, a system memory 603 coupled to system control unit 602, a storage device 604 (e.g., non-volatile memory (NVM)) coupled to system control unit 602, and a network interface 605 coupled to system control unit 602. System 600 may be used as an independent system to be used together with another external unit, to manage virtual GPUs configured on one or more physical GPUs, or may be used as a policy scheduling unit part of the system in FIG. 1.

Processor 601 may include at least one processor. Each processor may be a single-core processor or a multi-core processor. Processor 601 may include a dedicated processor (for example, a graphics processor, an application processor, and a baseband processor). During particular implementation, processor 601 may be configured to perform the method shown in FIG. 2 in different implementation manners.

System control unit 602 may include any corresponding interface controller, to provide an interface for at least one processor in processor 601 and/or any device or component that communicates with system control unit 602.

System control unit 602 may include at least one memory controller providing an interface for system memory 603. System memory 603 may be configured to load and store data and/or an instruction. System memory 603 may include any volatile memory, for example, a dynamic random-access memory (DRAM).

Storage device 604 may include at least one tangible and/or non-transitory computer readable medium. The computer readable medium is configured to store data and/or an instruction. Storage device 604 may include a non-volatile memory in any form, for example, a flash memory and/or any non-volatile storage device, for example, at least one hard disk drive (HDD), at least one disc drive and/or at least one digital versatile disk (DVD) drive.

System memory 603 and storage device 604 may respectively store a temporary copy and a persistent copy of an instruction program 607. Instruction program 607 stores an instruction set, which when executed, causes the system to performing the aforementioned methods. When the instruction in instruction 607 is executed by at least one processor in processor 601, system 600 is enabled to perform the method shown in FIGS. 2-4.

Network interface 605 may include a transceiver that provides a wireless interface for system 600. System 600 may implement inter-network communications and/or communications with another device through the wireless interface. Network interface 605 may include any hardware and/or firmware. Network interface 605 may include multiple antennas that provide multi-input wireless interfaces and multi-output wireless interfaces. In some embodiments, network interface 605 may be a network adapter, a wireless network adapter, a telephone modem, and/or a wireless modem.

In some embodiments, at least one processor in processor 601 and the control logic of at least one controller in system control unit 602 may be packaged together to form a System in Package (SiP). In some embodiments, the at least one processor in processor 601 and the control logic of the at least one controller in system control unit 602 may be integrated on the same chip. In some embodiments, the at least one processor in processor 601 and the control logic of the at least one controller in system control unit 602 may be integrated on the same chip, to form a System on Chip (SoC).

System 600 may further include an input/output (I/O) device 606. Input/output device 606 may include a user interface for interaction between a user and system 600 and/or a peripheral component interface for interaction between a peripheral component and system 600.

In some embodiments, the user interface may include, but is not limited to, a display (e.g., a liquid crystal display, a touch screen display or the like), a loudspeaker, a microphone, at least one photographing apparatus (e.g., a camera, and/or a video camera), a flash, and a keyboard.

In some embodiments, the peripheral component interface may include, but is not limited to, a non-volatile storage device port, an audio jack, and a power interface.

In some embodiments, system 600 may be deployed on an electronic device such as a personal computer or a mobile computing device. The mobile computing device may include, but is not limited to, a notebook computer, a tablet computer, a mobile telephone, and/or another intelligent device. In some embodiments, system 600 may include more or fewer components, and/or different architectures.

Examples of different embodiments are described in the following. Example 1 is an architecture system, including a control system, a GPU resource manager, a scheduling policy unit, a virtualization-supporting toolkit, a virtual machine, and a virtual GPU. The control system is configured to query whether a physical machine has sufficient resources for creating a type of virtual GPU; the GPU resource manager is configured to manage and allocate resources of a physical GPU and create the virtual GPU; the virtualization-supporting toolkit is configured to serve as an interaction channel between the control system and the GPU resource manager and add the virtual GPU to a specification file of the virtual machine; and the scheduling policy unit is configured to dynamically schedule, add, delete or upgrade the virtual GPU.

Example 2 is a method for implementing a virtual GPU, including: according to resource requirements of virtual GPUs running on the same physical GPU, allocating to each of the virtual GPUs a running time slice corresponding to the resource requirement of the virtual GPU. A sum of running time slices of all virtual GPUs disposed on the physical GPU is less than or equal to a scheduling period upper limit; and allocating computing resources of the physical GPU to the virtual GPUs in a manner of time slice polling according to the running time slices allocated to the virtual GPUs.

Example 3 may include the subject matter in Example 2, and may further specify that when more than one virtual GPU is disposed on the physical GPU, the virtual GPUs can be disposed as virtual GPUs having different resource requirements.

Example 4 may include the subject matter in Examples 2 and 3, and may further specify that the step of allocating computing resources of the physical GPU to the virtual GPUs in a manner of time slice polling includes: selecting a next ready-to-run virtual GPU from a scheduling queue; invoking a register interface of the physical GPU corresponding to the virtual GPU to run the virtual GPU; and stopping the virtual GPU from running and keeping the state of the virtual GPU through the register interface of the physical GPU when an accumulated running time of the virtual GPU reaches a running time slice allocated to the virtual GPU, and then returning to the step of selecting a next ready-to-run virtual GPU from a scheduling queue.

Example 5 may include the subject matter in Examples 2 to 4, and may further specify that when the method for implementing a virtual GPU is used, a virtual GPU is dynamically added to run on the physical GPU, including: determining whether the physical GPU has a sufficient remaining time slice and a sufficient frame buffer space for meeting a computing resource requirement of a virtual GPU to be created; if yes, obtaining a frame buffer space for creating the virtual GPU through division from an unused frame buffer space chain; creating the virtual GPU to be created and allocating a corresponding virtual GPU ID; and adding the virtual GPU to be created to the scheduling queue.

Example 6 may include the subject matter in Examples 2 to 5, and may further specify that the step of determining whether the physical GPU has a sufficient remaining time slice includes: determining whether a sum of a time slice that should be allocated to the virtual GPU to be created and time slices of original virtual GPUs is less than or equal to the scheduling period upper limit of the physical GPU; and if yes, determining that the physical GPU has a sufficient remaining time slice.

Example 7 may include the subject matter in Examples 2 to 6, and may further specify that in the step of determining whether the physical GPU has a sufficient frame buffer space, the frame buffer space refers to a continuous frame buffer space.

Example 8 may include the subject matter in Examples 2 to 7, and may further specify that the step of obtaining a frame buffer space for creating the virtual GPU through division from an unused frame buffer space chain includes: finding a segment whose size is the closest to the size of the frame buffer space for the virtual GPU to be created from the unused frame buffer space chain, to obtain the frame buffer space for the virtual GPU to be created through division.

Example 9 may include the subject matter in Examples 2 to 8, and may further specify that when the method for implementing a virtual GPU is used, a virtual GPU running on the physical GPU can be dynamically deleted, including: removing a virtual GPU to be deleted from the scheduling queue; and allocating proportionally a running time slice of the virtual GPU to be deleted to remaining virtual GPUs according to computing resource requirements of the remaining virtual GPUs.

Example 10 may include the subject matter in Examples 2 to 9, and may further specify that when the method for implementing a virtual GPU is used, a virtual GPU running on the physical GPU can be dynamically upgraded, including: determining whether a sum of a running time slice that should be allocated to an upgraded virtual GPU and running time slices of other nonupgraded virtual GPUs is less than or equal to the scheduling period upper limit; and if yes, changing a running time slice corresponding to the virtual GPU before the upgrade to the running time slice corresponding to the upgraded virtual GPU in the scheduling queue.

Example 11 is an apparatus for implementing a virtual GPU, including: an allocating unit configured to, according to resource requirements of virtual GPUs running on the same physical GPU, allocate to each of the virtual GPUs a running time slice corresponding to the resource requirement of the virtual GPU, wherein a sum of running time slices of all virtual GPUs disposed on the physical GPU is less than or equal to a scheduling period upper limit; and a scheduling unit configured to allocate computing resources of the physical GPU to the virtual GPUs in a manner of time slice polling according to the running time slices allocated to the virtual GPUs.

Example 12 may include the subject matter in Example 11, and may further specify that when more than one virtual GPU is disposed on the physical GPU, the virtual GPUs can be disposed as virtual GPUs having different resource requirements.

Example 13 may include the subject matter in Example 11 and 12, and may further specify that the scheduling unit includes: a selecting subunit configured to select a next ready-to-run virtual GPU from a scheduling queue; a running subunit configured to invoke a register interface of the physical GPU corresponding to the virtual GPU to run the virtual GPU; and a stop subunit configured to stop the virtual GPU from running and keep the state of the virtual GPU through the register interface of the physical GPU when an accumulated running time of the virtual GPU reaches a running time slice allocated to the virtual GPU, and then return to the step of selecting a next ready-to-run virtual GPU from a scheduling queue.

Example 14 may include the subject matter in Examples 11 to 13, and may further specify that the apparatus for implementing a virtual GPU includes an adding subunit configured to dynamically add a virtual GPU to run on the physical GPU, including: a time slice and buffer space determining subunit configured to determine whether the physical GPU has a sufficient remaining time slice and a sufficient frame buffer space for a meeting a computing resource requirement of a virtual GPU to be created; a dividing subunit configured to obtain a frame buffer space for creating the virtual GPU through division from an unused frame buffer space chain when an output of the determining subunit is yes; a creating subunit configured to create the virtual GPU to be created and allocate a corresponding virtual GPU ID; and an adding subunit configured to add the virtual GPU to be created to the scheduling queue.

Example 15 may include the subject matter in Examples 11 to 14, and may further specify that the time slice determining subunit is specifically configured to determine whether a sum of a time slice that should be allocated to the virtual GPU to be created and time slices of original virtual GPUs is less than or equal to the scheduling period upper limit of the physical GPU; and if yes, determine that the physical GPU has a sufficient remaining time slice.

Example 16 may include the subject matter in Examples 11 to 15, and may further specify that the frame buffer space of the sufficient frame buffer space is a continuous frame buffer space.

Example 17 may include the subject matter in Examples 11 to 16, and may further specify that the dividing subunit is specifically configured to find a segment whose size is the closest to the size of the frame buffer space for the virtual GPU to be created from the unused frame buffer space chain, to obtain the frame buffer space for the virtual GPU to be created through division.

Example 18 may include the subject matter in Examples 11 to 17, and may further specify that the apparatus for implementing a virtual GPU includes a deleting unit configured to dynamically delete a virtual GPU running on the physical GPU, including: a removal subunit configured to remove a virtual GPU to be deleted from the scheduling queue; and an allocating subunit configured to allocate proportionally a running time slice of the virtual GPU to be deleted to remaining virtual GPUs according to computing resource requirements of the remaining virtual GPUs.

Example 19 may include the subject matter in Examples 11 to 18, and may further specify that the apparatus for scheduling a virtual GPU includes an upgrade unit configured to dynamically upgrade a virtual GPU running on the physical GPU, including: a determining subunit configured to determine whether a sum of a running time slice that should be allocated to an upgraded virtual GPU and running time slices of other nonupgraded virtual GPUs is less than or equal to the scheduling period upper limit; and a change subunit configured to change a running time slice corresponding to the virtual GPU before the upgrade to the running time slice corresponding to the upgraded virtual GPU in the scheduling queue when an output of the determining subunit is yes.

Example 20 is a system, including: a processor; and a memory configured to store an instruction, wherein when the instruction is read and executed by the processor, the method in any of Examples 2 to 10 is performed.

It will be apparent to those skilled in the art that various modifications and variations can be made to the disclosed system and related methods. Other embodiments will be apparent to those skilled in the art from consideration of the specification and practice of the disclosed system and related methods. For example, while the embodiments refer to GPUs, it is appreciated that the disclosed concepts are also applicable to any processing unit.

What is claimed is:

1. An architecture system for managing a virtual GPU, comprising: a control system configured to determine whether a physical GPU has sufficient resources for creating the virtual GPU;
a resource manager configured to;
in response to the physical GPU having sufficient resources for creating the virtual GPU, obtain a frame buffer space for creating the virtual GPU by dividing an unused frame buffer space,
create the virtual GPU based on the obtained frame buffer space, and add the created virtual GPU to a scheduling queue,
allocate a running time slice to the created virtual GPU corresponding to a resource requirement of the virtual GPU, wherein a sum of running time slices of one or more virtual GPUs configured on the physical GPU is less than or equal to a scheduling period,
allocate resources of the physical GPU to the created virtual GPU according to the running time slices allocated to the one or more virtual GPUs;
a virtualization-supporting toolkit configured to add the created virtual GPU to a specification file of a virtual machine; and
a scheduling policy unit configured to schedule, add, delete or upgrade the created virtual GPU.

2. A method for implementing one or more virtual GPUs, comprising: determining whether a physical GPU has resources for creating a virtual GPU of the virtual GPUs; in response to the physical GPU having resources for creating the virtual GPU, obtaining a frame buffer space for creating the virtual GPU by dividing an unused frame buffer space; allocating each of the one or more virtual GPUs a running time slice corresponding to a resource requirement of the virtual GPU according to resource requirements of the one or more virtual GPUs running on a physical GPU, wherein a sum of running time slices of the one or more virtual GPUs configured on the physical GPU is less than or equal to a scheduling period; allocating resources of the physical GPU to the one or more virtual GPUs according to the running time slices allocated to the one or more virtual GPUs; creating the virtual GPU based on the obtained frame buffer space; and adding the created virtual GPU to a scheduling queue.

3. The method of claim 2, wherein the resources of the physical GPU are allocated to the virtual GPUs in a manner of time slice polling.

4. The method of claim 2, wherein the virtual GPUs have different resource requirements.

5. The method of claim 2, wherein allocating resources of the physical GPU to the virtual GPUs according to the running time slices allocated to the virtual GPUs comprises:
selecting the virtual GPU from a scheduling queue;
invoking a register interface of the physical GPU corresponding to the virtual GPU;
determining whether an accumulated running time of the virtual GPU reaches a running time slice allocated to the virtual GPU; and
in response to the accumulated running time of the virtual GPU reaching a running time slice allocated to the virtual GPU, stopping the virtual GPU from running and keeping a state of the virtual GPU via the register interface of the physical GPU.

6. The method of claim 2, wherein the resources for creating the virtual GPU include a sufficient remaining time slice, and the method further comprises: determining whether a sum of a time slice for creating the virtual GPU and time slices of existing virtual GPUs is less than or equal to the scheduling period of the physical GPU; and in response to the sum of the time slice for creating the virtual GPU and the time slices of the existing virtual GPUs being less than or equal to the scheduling period of the physical GPU, determining that the physical GPU has the sufficient remaining time slice.

7. The method of claim 2, wherein the resources for creating the virtual GPU further include a sufficient frame buffer space.

8. The method of claim 2, wherein obtaining a frame buffer space for the virtual GPU by dividing the unused frame buffer space comprises:
dividing the unused frame buffer space into a plurality of segments; and
determining a segment corresponding to the frame buffer space for creating the virtual GPU.

9. The method of claim 2, further comprising:
removing the virtual GPU to be deleted from the scheduling queue; and
allocating a running time slice of the virtual GPU to be deleted to remaining virtual GPUs according to computing resource requirements of the remaining virtual GPUs.

10. The method of claim 2, further comprising:
determining the virtual GPU for upgrading;
determining whether a sum of a running time slice of the virtual GPU for upgrading and running time slices of other virtual GPUs is less than or equal to the scheduling period; and
in response to the sum of the running time slice of the virtual GPU for upgrading and the running time slices of other virtual GPUs being less than or equal to the scheduling period, modifying the running time slice of the virtual GPU for upgrading.

11. An apparatus for implementing one or more virtual GPUs, comprising: a memory storing a set of instructions; and a processor configured to execute the set of instructions to cause the apparatus to: determine whether a physical GPU has resources for creating a virtual GPU of the one or more virtual GPUs; in response to the physical GPU having resources for creating the virtual GPU, obtain a frame buffer space for creating the virtual GPU by dividing an unused frame buffer space; allocate each of the one or more virtual GPUs a running time slice corresponding to a resource requirement of the virtual GPU, according to resource requirements of the one or more virtual GPUs running on a physical GPU, wherein a sum of running time slices of the one or more virtual GPUs configured on the physical GPU is less than or equal to a scheduling period; allocate resources of the physical GPU to the one or more virtual GPUs according to the running time slices allocated to the one or more virtual GPUs; create the virtual GPU based on the obtained frame buffer space and add the created virtual GPU to a scheduling queue.

12. The apparatus of claim 11, wherein the resources of the physical GPU is allocated to the virtual GPU in a manner of time slice polling.

13. The apparatus of claim 11, wherein the processor is further configured to execute the set of instructions to cause the apparatus to:
- select the virtual GPU from a scheduling queue;
- invoke a register interface of the physical GPU corresponding to the virtual GPU; and
- determine whether an accumulated running time of the virtual GPU reaches a running time slice allocated to the virtual GPU, stop the virtual GPU from running and keep a state of the virtual GPU via the register interface of the physical GPU in response to the accumulated running time of the virtual GPU reaching the running time slice allocated to the virtual GPU.

14. The apparatus of claim 11, wherein the resources for creating the virtual GPU include a sufficient remaining time slice, and the processor is further configured to execute the set of instructions to cause the apparatus to:
- determine whether a sum of a time slice for creating the virtual GPU and time slices of existing virtual GPUs is less than or equal to the scheduling period of the physical GPU; and
- in response to the sum of the time slice for creating the virtual GPU and the time slices of the existing virtual GPUs being less than or equal to the scheduling period of the physical GPU, determine that the physical GPU has the sufficient remaining time slice.

15. The apparatus of claim 11, wherein the processor is further configured to execute the set of instructions to cause the apparatus to:
- divide the unused frame buffer space into a plurality of segments; and
- determining a segment corresponding to the frame buffer space for creating the virtual GPU.

16. The apparatus of claim 11, wherein the processor is further configured to execute the set of instructions to cause the apparatus to:
- remove the virtual GPU to be deleted from the scheduling queue; and
- allocate a running time slice of the virtual GPU to be deleted to remaining virtual GPUs according to computing resource requirements of the remaining virtual GPUs.

17. The apparatus of claim 11, wherein the processor is further configured to execute the set of instructions to cause the apparatus to:
- determine the virtual GPU for upgrading, and determine whether a sum of a running time slice of the virtual GPU for upgrading and running time slices of other virtual GPUs is less than or equal to the scheduling period; and
- in response to the sum of the running time slice of the virtual GPU for upgrading and the running time slices of other virtual GPUs being less than or equal to the scheduling period, modify the running time slice of the virtual GPU for upgrading.

18. A non-transitory computer readable medium that stores a set of instructions that is executable by at least one processor of an electronic device to cause the device to perform a method for implementing virtual GPUs, the method comprising: determining whether a physical GPU has resources for creating a virtual GPU of the one or more virtual GPUs; in response to the physical GPU having resources for creating the virtual GPU, obtaining a frame buffer space for creating the virtual GPU by dividing an unused frame buffer space; allocating each of one or more virtual GPUs a running time slice corresponding to a resource requirement of the virtual GPU according to resource requirements of the one or more virtual GPUs running on a physical GPU, wherein a sum of running time slices of the one or more virtual GPUs configured on the physical GPU is less than or equal to a scheduling period; allocating resources of the physical GPU to the one or more virtual GPUs according to the running time slices allocated to the one or more virtual GPUs; creating the virtual GPU based on the obtained frame buffer space; and adding the created virtual GPU to a scheduling queue.

* * * * *